United States Patent
Tao et al.

(10) Patent No.: US 10,282,293 B2
(45) Date of Patent: May 7, 2019

(54) METHOD, SWITCH, AND MULTIPROCESSOR SYSTEM USING COMPUTATIONS AND LOCAL MEMORY OPERATIONS

(71) Applicant: Huawei Technologies Co., Ltd., Shenzhen, Guangdong (CN)

(72) Inventors: Yidong Tao, Shanghai (CN); Rui He, Hangzhou (CN); Xiaowen Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 15/607,200

(22) Filed: May 26, 2017

(65) Prior Publication Data
US 2017/0262371 A1    Sep. 14, 2017

Related U.S. Application Data

(63) Continuation of application No. PCT/CN2014/092421, filed on Nov. 28, 2014.

(51) Int. Cl.
*G06F 13/16* (2006.01)
*H04L 12/54* (2013.01)
(Continued)

(52) U.S. Cl.
CPC ...... *G06F 12/0813* (2013.01); *G06F 12/0815* (2013.01); *G06F 13/1652* (2013.01);
(Continued)

(58) Field of Classification Search
CPC .. G06F 12/0813; G06F 13/16; G06F 13/1652; G06F 2211/005; H04L 12/54; H04L 45/38; H04L 12/56
See application file for complete search history.

(56) References Cited

U.S. PATENT DOCUMENTS

2006/0155935 A1    7/2006    Jones et al.
2011/0296063 A1*   12/2011   Pais ................... G06F 5/12
                                              710/56
(Continued)

FOREIGN PATENT DOCUMENTS

| CN | 102946325 A | 2/2013 |
| CN | 103036653 A | 4/2013 |

(Continued)

OTHER PUBLICATIONS

Ravi Iyer et al., "Switch Cache: A Framework for Improving the Remote Memory Access Latency of CC-NUMA Multiprocessors", Fifth International Conference on High-Performance Computer Architecture, Jan. 9-13, 1999, 9 pages.
(Continued)

*Primary Examiner* — Charles C Jiang
*Assistant Examiner* — Kyaw Z Soe

(57) ABSTRACT

A memory access method includes: receiving, by the switch, a data packet; matching a flow table on the data packet, where the flow table includes at least one flow entry, where the flow entry includes a matching field and an action field, and the at least one flow entry includes a first flow entry, where a matching field of the first flow entry is used to match source node information, destination node information, and a protocol type in the data packet, and an action field of the first flow entry is used to indicate an operation command for a storage device embedded in the switch; and when the data packet successfully matches the first flow entry, performing an operation on the storage device according to the operation command in the action field of the successfully matched first flow entry.

7 Claims, 8 Drawing Sheets

(51) Int. Cl.
H04L 12/721 (2013.01)
H04L 12/741 (2013.01)
G06F 12/0813 (2016.01)
G06F 12/0815 (2016.01)

(52) U.S. Cl.
CPC .............. *H04L 12/56* (2013.01); *H04L 45/38* (2013.01); *H04L 45/745* (2013.01); *G06F 2211/005* (2013.01); *G06F 2212/1024* (2013.01); *G06F 2212/154* (2013.01)

(56) References Cited

U.S. PATENT DOCUMENTS

| | | |
|---|---|---|
| 2011/0317691 A1 | 12/2011 | Kajihara |
| 2013/0088965 A1 | 4/2013 | Pais et al. |
| 2013/0142073 A1 | 6/2013 | Shikitani |
| 2014/0112344 A1 | 4/2014 | Mineshita |
| 2014/0241356 A1* | 8/2014 | Zhang .................... H04L 45/38 370/392 |
| 2014/0244966 A1* | 8/2014 | Bosshart ................ H04L 49/90 711/206 |
| 2014/0355448 A1 | 12/2014 | Kawano |
| 2015/0009828 A1 | 1/2015 | Murakami |
| 2015/0063361 A1* | 3/2015 | Hamada ................. H04L 45/44 370/400 |
| 2015/0334001 A1 | 11/2015 | Sato |

FOREIGN PATENT DOCUMENTS

| | | |
|---|---|---|
| CN | 103401784 A | 11/2013 |
| CN | 103501280 A | 1/2014 |
| EP | 2608461 A1 | 6/2013 |
| JP | 2011170718 A | 9/2011 |
| JP | 2011204233 A | 10/2011 |
| JP | 2013201478 A | 10/2013 |
| JP | WO2012023538 A1 | 10/2013 |
| WO | 2010/104033 A1 | 9/2010 |
| WO | 2013/114490 A1 | 8/2013 |
| WO | 2013/133227 A1 | 9/2013 |
| WO | 2013/146808 A1 | 10/2013 |
| WO | 2014/112612 A1 | 7/2014 |

OTHER PUBLICATIONS

"OpenFlow Switch Specification, Version 1.0.0 (Wire Protocol 0x01)", Open Networking Foundation, Dec. 31, 2009, 44 pages.

Daewook Kim et al., "DCOS: Cache Embedded Switch Architecture for Distributed Shared Memory Multiprocessor SoCs", IEEE, 2006, 4 pages.

* cited by examiner

METHOD, SWITCH, AND MULTIPROCESSOR SYSTEM USING COMPUTATIONS AND LOCAL MEMORY OPERATIONS

CROSS-REFERENCE TO RELATED APPLICATION

This application is a continuation of International Application No. PCT/CN2014/092421, filed on Nov. 28, 2014, the disclosure of which is hereby incorporated by reference in its entirety.

TECHNICAL FIELD

The present application relates to the field of computer technologies, and in particular, to a memory access method, a switch, and a multiprocessor system.

BACKGROUND

Increasingly higher requirements for a computer speed and a computation scale lead to a multiprocessor system. In the multiprocessor system, multiple processors communicate with each other by using an interconnection network. The interconnection network usually includes multiple switches, so that the interconnection network can be connected to a processor responsible for computation, and can also be connected to a memory responsible for storage. When a processor needs to access a memory, a request is forwarded to the memory by using the interconnection network. However, an increasing quantity of processors and memories results in an increasing scale of the interconnection network, and further results in an increasing access delay when a processor accesses a remote memory. Consequently, system performance deteriorates.

A method for reducing an access delay when a processor accesses a remote memory (that is, a memory connected to a port of a switch) is provided in the prior art. In the method, all switches in the interconnection network have a cache (Cache) function, so as to cache some memory data. When data that a processor needs to access is in a switch, the data may be returned directly by using a cache in the switch, so that a remote memory does not need to be accessed, and an access delay is reduced.

In a process of implementing the present application, the inventor finds that the prior art has at least the following problems:

All switches have caches, and data cached in each cache may include shared data, that is, data used by multiple processors. When shared data in a cache of a switch is modified and a copy of the shared data exists in a cache of another switch, if the copy in the another switch cannot be modified in a timely manner and the data is accessed by another processor, an error occurs. Therefore, to avoid the error of the processor, data consistency in the caches needs to be ensured. However, maintenance of cache coherence is usually extremely complex.

SUMMARY

To resolve a prior-art problem of difficult maintenance of cache coherence when a cache in a switch is used to reduce an access delay, embodiments of the present application provide a memory access method, a switch and a multiprocessor system. The technical solutions are as follows:

According to a first aspect, an embodiment of the present application provides a memory access method, where the method includes:

receiving, by a switch, a data packet, where the data packet includes source node information, destination node information, and a protocol type, where the protocol type is used to indicate a type of the data packet;

performing flow table matching on the data packet, where the flow table includes at least one flow entry, where the flow entry includes a matching field and an action field, and the at least one flow entry includes a first flow entry, where a matching field of the first flow entry is used to match the source node information, the destination node information, and the protocol type in the data packet, and an action field of the first flow entry is used to indicate an operation command for a storage device embedded in the switch; and when the data packet successfully matches the first flow entry, performing an operation on the storage device according to the operation command in the action field of the successfully matched first flow entry.

In a first possible implementation manner of the first aspect, the performing an operation on the storage device according to the operation command in the action field of the successfully matched first flow entry includes:

when the operation command in the action field of the successfully matched first flow entry is a read operation command, reading data from the storage device and returning the read data to a node corresponding to the source node information; or when the operation command in the action field of the successfully matched first flow entry is a write operation command, writing data that is in the data packet into the storage device.

In a second possible implementation manner of the first aspect, the at least one flow entry further includes a second flow entry, where a matching field of the second flow entry is used to match the source node information, the destination node information, and the protocol type in the data packet, and an action field of the second flow entry is used to indicate an operation command for performing computation processing on the data in the data packet.

Further, in the second possible implementation manner, the method further includes:

when the data packet successfully matches the second flow entry, performing computation processing on the data in the data packet according to the operation command in the action field of the successfully matched second flow entry, to obtain a computation result; and sending the computation result to the node corresponding to the source node information in the data packet.

In a third possible implementation manner of the first aspect, the method further includes:

receiving a flow table configuration message sent by a controller, where the flow table configuration message is used to configure the flow entry for the switch; and configuring the flow entry according to the flow table configuration message.

According to a second aspect, an embodiment of the present application provides a switch, where the switch includes:

a first receiving module, configured to receive a data packet, where the data packet includes source node information, destination node information, and a protocol type, where the protocol type is used to indicate a type of the data packet;

a matching module, configured to perform flow table matching on the data packet received by the first receiving module, where the flow table includes at least one flow entry, where the flow entry includes a matching field and an action field, and the at least one flow entry includes a first flow entry, where a matching field of the first flow entry is used to match the source node information, the destination node information, and the protocol type in the data packet, and an action field of the first flow entry is used to indicate an operation command for a storage device embedded in the switch; and an operation module, configured to: when the data packet successfully matches the first flow entry, perform an operation on the storage device according to the operation command in the action field of the successfully matched first flow entry.

In a first possible implementation manner of the second aspect, the operation module includes:

a read unit, configured to read data from the storage device when the operation command is a read operation command;

a sending unit, configured to return the data read by the read unit to a node corresponding to the source node information; and a write unit, configured to write data that is in the data packet into the storage device when the operation command is a write operation command.

In a second possible implementation manner of the second aspect, the at least one flow entry further includes a second flow entry, where a matching field of the second flow entry is used to match the source node information, the destination node information, and the protocol type in the data packet, and an action field of the second flow entry is used to indicate an operation command for performing computation processing on the data in the data packet.

Further, in the second possible implementation manner, the switch further includes:

a processing module, configured to: when the data packet successfully matches the second flow entry, perform computation processing on the data in the data packet according to the operation command in the action field of the successfully matched second flow entry, to obtain a computation result; and a sending module, configured to send the computation result obtained by the processing module to the node corresponding to the source node information in the data packet.

In a third possible implementation manner of the second aspect, the switch further includes:

a second receiving module, configured to receive a flow table configuration message sent by a controller, where the flow table configuration message is used to configure the flow entry for the switch; and a configuration module, configured to configure the flow entry according to the flow table configuration message received by the second receiving module.

According to a third aspect, an embodiment of the present application provides a switch, where the switch includes a processor, a memory, a bus, and a communications interface, where the memory is configured to store a computer execution command, the processor and the memory are connected by using the bus, and when the computer runs, the processor executes the computer execution command stored in the memory, so that the switch executes the method provided in the first aspect.

According to a fourth aspect, an embodiment of the present application provides a switch, where the switch includes:

an input port, configured to receive a data packet, where the data packet includes source node information, destination node information, and a protocol type, where the protocol type is used to indicate a type of the data packet;

a memory, configured to store a flow table, where the flow table includes at least one flow entry, where the flow entry includes a matching field and an action field, and the at least one flow entry includes a first flow entry, where a matching field of the first flow entry is used to match the source node information, the destination node information, and the protocol type in the data packet, and an action field of the first flow entry is used to indicate an operation command for a storage device embedded in the switch;

a storage device, configured to store data;

a table lookup logic circuit, configured to perform, by using the flow table stored in the memory, flow table matching on the data packet received at the input port;

an operation logic circuit, configured to: when the data packet successfully matches the first flow entry, perform an operation on the storage device according to the operation command in the action field of the successfully matched first flow entry;

a crossbar bus, configured to select an output port for the data packet transmitted by using the operation logic circuit; and an output port, configured to send the data packet transmitted by using the crossbar bus.

According to a fifth aspect, an embodiment of the present application provides a multiprocessor system, where the multiprocessor system includes multiple processors and an interconnection network, where the multiple processors are communicatively connected to each other by using the interconnection network, and the interconnection network includes multiple switches, where the switch includes the switch provided in the second aspect or the third aspect or the fourth aspect.

In a first possible implementation manner of the fifth aspect, the multiprocessor system further includes multiple external storage devices, where the multiple external storage devices are communicatively connected to the multiple processors by using the interconnection network.

In a second possible implementation manner of the fifth aspect, the multiprocessor system is a system on chip.

The technical solutions provided in the embodiments of the present application bring the following beneficial effects: A storage device is embedded in a switch, and flow table matching is performed on a received data packet; and when the data packet successfully matches a first flow entry in a flow table, an operation is directly performed, according to an operation command in an action field of the first flow entry, on the storage device embedded in the switch, so as to reduce and even eliminate a possibility that a processor accesses a remote memory, and reduce a memory access delay. In addition, because storage devices in switches store data separately, there is no copy in a storage device in another switch and no problem for maintaining cache coherence. This simplifies the implementation.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

To make the objectives, technical solutions, and advantages of the present application clearer, the following further describes the embodiments of the present application in detail with reference to the accompanying drawings.

Embodiments of the present application provide a memory access method, a switch, and a multiprocessor system. The following describes a network architecture of a multiprocessor system with reference to FIG. 1.

Figure 1:
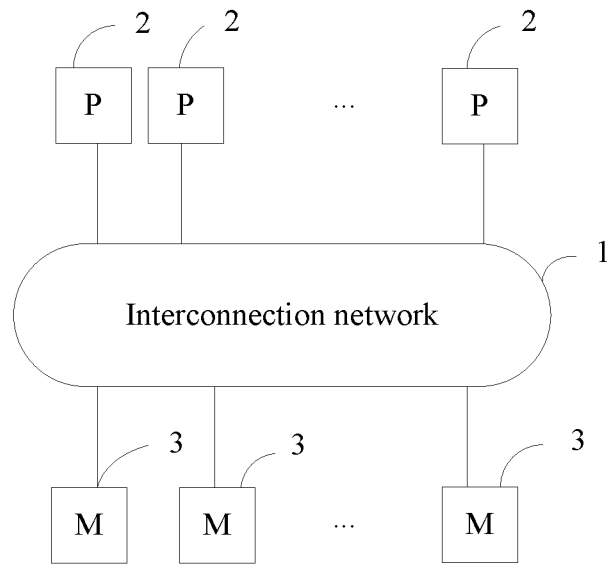
FIG. 1 is a schematic structural diagram of a multiprocessor system.

Referring to FIG. 1, in the multiprocessor system, multiple processors 2 are connected to each other by using an interconnection network 1. The interconnection network includes multiple switches, and these switches are responsible for forwarding communication data between the processors 2. In addition, the multiprocessor system further includes multiple separate storage devices 3, and the storage devices 3 are connected to the processors 2 by using the interconnection network 1. Therefore, these switches in the interconnection network 1 are further responsible for forwarding access requests from the processors 2 to the storage devices 3 and forwarding reply messages returned by the storage devices 3 to the processors 2.

It is easy to learn that, the foregoing network architecture of the multiprocessor system is merely an example, and does not impose limitation on the embodiments of the present application. For example, the multiprocessor system may not include the storage devices 3.

Embodiment 1

Figure 2:
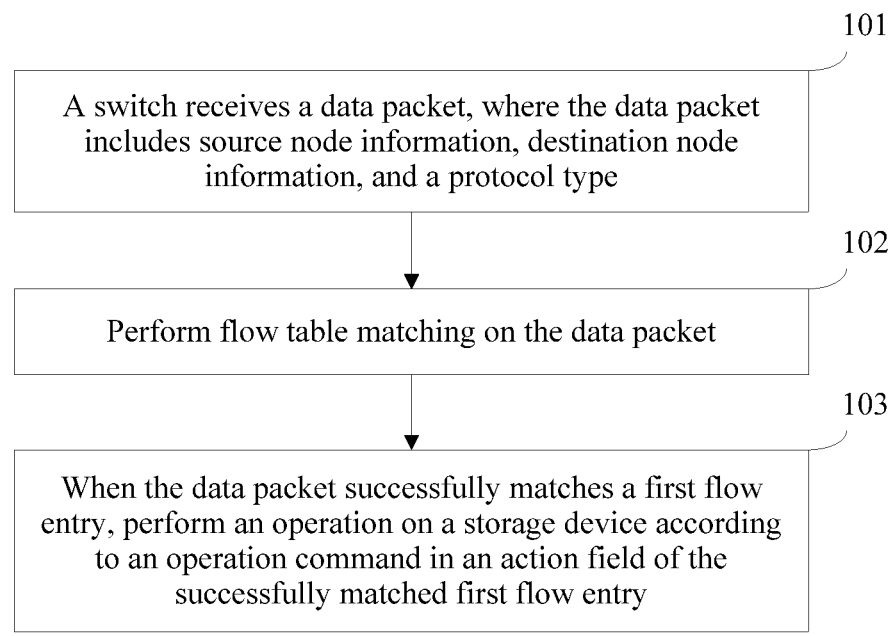
FIG. 2 is a flowchart of a memory access method according to Embodiment 1 of the present application.

This embodiment of the present application provides a memory access method applicable to the foregoing multiprocessor system. The method may be executed by a switch. In specific implementation, the switch may be an OpenFlow switch (OFS), or another switch having a matching function. As shown in FIG. 2, the method includes the following steps.

Step 101: The switch receives a data packet, where the data packet includes source node information, destination node information, and a protocol type.

The source node information may be a source node identifier, a source node media Access control (MAC address), or the like. The destination node information may be a destination node identifier, a destination node MAC address, or the like. The protocol type is used to indicate a type of the data packet, such as a read request data packet, a write request data packet, or a computation request data packet.

In this embodiment of the present application, a storage device is embedded in the switch. The storage device may be a static random access memory (SRAM), a dynamic random access memory (DRAM), or the like.

It is easy to learn that a flow table is set in the OFS. The flow table includes at least one flow entry, and each flow entry includes a matching field and an action field. The flow entry in the flow table usually includes a forwarding flow entry. The forwarding flow entry is used to determine a forwarding egress of a data packet. The flow entry in the flow table may further include a data packet modification flow entry. The data packet modification flow entry is used to determine to modify information in a data packet, for example, to modify a header field in the data packet.

Step 102: Perform flow table matching on the data packet.

As described above, the flow table in the switch may include multiple entries. However, in this embodiment of the present application, the flow entry further includes a first flow entry. A matching field of the first flow entry is used to match the source node information, the destination node information, and the protocol type in the data packet, and an action field of the first flow entry is used to indicate an operation command for the storage device embedded in the switch. The operation command includes but is not limited to a read operation command and a write operation command.

It is easy to learn that, the operation command in the action field of the first flow entry is generally mutually corresponding to the protocol type in the matching field of the first flow entry. For example, if the protocol type in the matching field of the first flow entry is used to indicate a read request data packet, the operation command in the action field of the first flow entry is a read operation command for the storage device embedded in the switch.

In implementation, various flow entries (such as the first flow entry, the forwarding flow entry, and the data packet modification flow entry) may be configured in one flow table, or different flow entries may be configured in different flow tables according to functions of the flow entries.

Various flow tables are usually set in a ternary content addressable memory TCAM) or a reduced latency dynamic random access memory (RLDRAM) of the switch.

It is easy to learn that the flow entry in the switch may be configured by an OpenFlow controller (OFC).

Step 103: When the data packet successfully matches a first flow entry, perform an operation on a storage device according to an operation command in an action field of the successfully matched first flow entry.

Specifically, step 103 may include:

when the operation command in the action field of the successfully matched first flow entry is a read operation command, reading data from the storage device and returning the read data to a node corresponding to the source node information; or when the operation command in the action field of the successfully matched first flow entry is a write operation command, writing data that is in the data packet into the storage device.

In this embodiment of the present application, a storage device is embedded in a switch, and flow table matching is performed on a received data packet; and when the data packet successfully matches a first flow entry in a flow table, an operation is directly performed, according to an operation command in an action field of the first flow entry, on the storage device embedded in the switch, so as to reduce and even eliminate a possibility that a processor accesses a remote memory, and reduce a memory access delay. In addition, because storage devices in switches store data separately, there is no copy in a storage device in another switch and no problem for maintaining cache coherence. This simplifies the implementation. Moreover, when the first flow entry is successfully matched, because each switch directly accesses a storage device inside the switch, for one access request, an interconnection network needs to be accessed and detached only once (that is, receiving the access request and returning a reply message), so as to save network resources.

Embodiment 2

This embodiment of the present application provides a memory access method applicable to the foregoing multi-processor system. A flow table is set in a switch. The flow table includes at least one flow entry, and each flow entry includes a matching field and an action field. The matching field is used to match information in a data packet received by the switch, and the action field is used to indicate an operation to be performed on the data packet when the flow entry is successfully matched. The flow entry in the flow table usually includes a forwarding flow entry. The forwarding flow entry is used to determine a forwarding egress of a data packet. The flow entry in the flow table may further include a data packet modification flow entry. The data packet modification flow entry is used to determine to modify information in a data packet, for example, to modify a header field in the data packet. In addition, a storage device (also referred to a memory) such as an SRAM or a DRAM is further embedded in the switch. In implementation, the switch may be an OFS, or may be another switch having a matching function.

Figure 3:
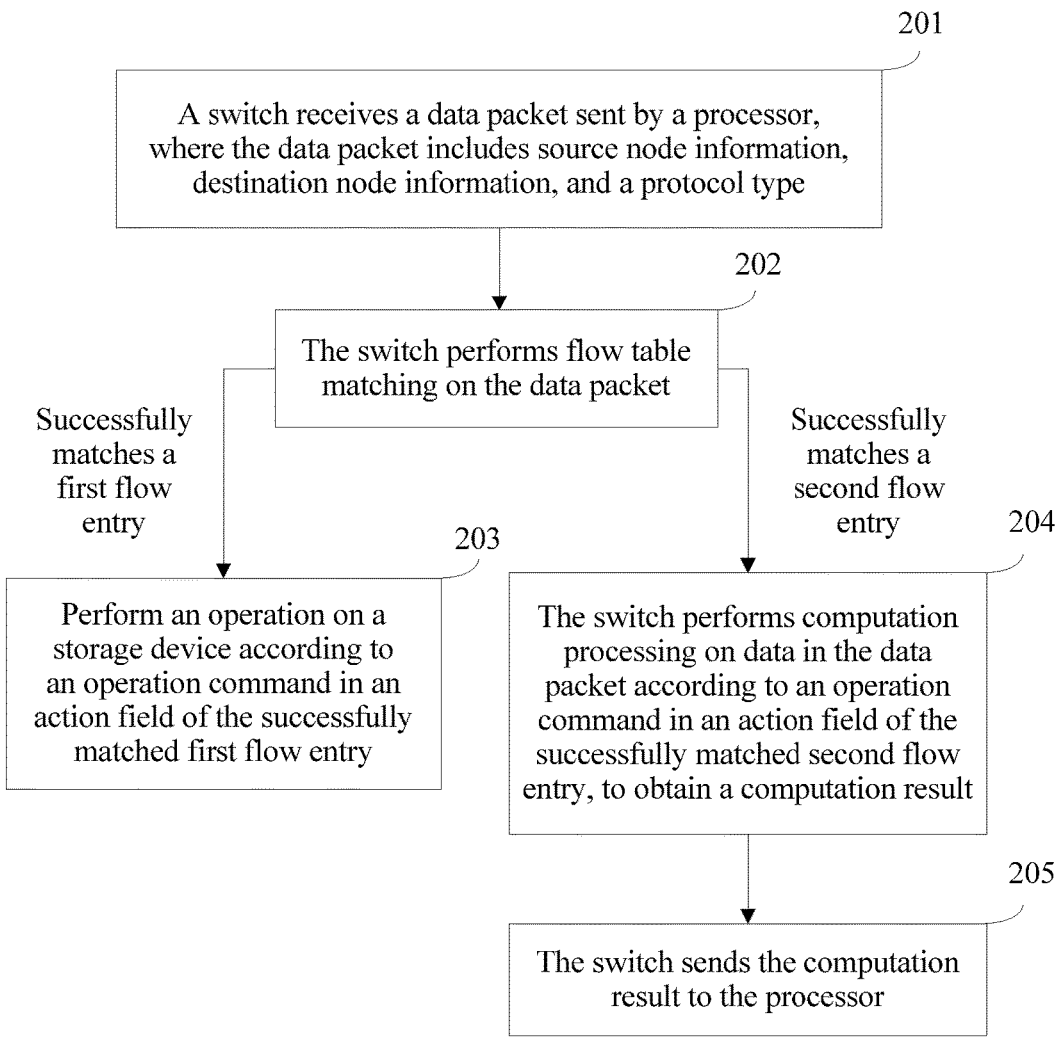
FIG. 3 is a flowchart of a memory access method according to Embodiment 2 of the present application.

The following describes in detail the method in this embodiment with reference to FIG. 3. As shown in FIG. 3, the method includes the following steps.

Step 201: The switch receives a data packet sent by a processor, where the data packet includes source node information, destination node information, and a protocol type.

The source node information may be a source node identifier, a source node MAC address, or the like. The destination node information may be a destination node identifier, a destination node MAC address, or the like. The protocol type is used to indicate a type of the data packet, such as a read request data packet, a write request data packet, or a computation request data packet.

The data packet may further include an operation address, such as a read/write address. It may be understood that when the data packet is a write data packet, the data packet further includes to-be-written data.

Step 202: The switch performs flow table matching on the data packet. When the data packet successfully matches a first flow entry, perform step 203. When the data packet successfully matches a second flow entry, perform steps 204 and 205.

As described above, the flow table in the switch may include multiple entries. It should be emphasized that, in this embodiment of the present application, the flow entry further includes the first flow entry. A matching field of the first flow entry is used to match the source node information, the destination node information, and the protocol type in the data packet, and an action field of the first flow entry is used to indicate an operation command for the storage device embedded in the switch. The operation command includes but is not limited to a read operation command and a write operation command.

It is easy to learn that, the operation command in the action field of the first flow entry is generally mutually corresponding to the protocol type in the matching field of the first flow entry. For example, if the protocol type in the matching field of the first flow entry is used to indicate a read request data packet, the operation command in the action field of the first flow entry is a read operation command for the storage device embedded in the switch.

In addition, in this embodiment, the flow entry may further include the second flow entry. A matching field of the second flow entry is used to match the source node information, the destination node information, and the protocol type in the data packet, and an action field of the second flow entry is used to indicate an operation command for performing computation processing on the data in the data packet. The computation processing includes but is not limited to a cyclic redundancy check (Cyclic Redundancy Check, CRC for short) or fast Fourier transformation (Fast Fourier Transformation, FFT for short).

In implementation, various flow entries (such as the first flow entry, the forwarding flow entry, and the data packet modification flow entry) may be configured in one flow table, or different flow entries may be configured in different flow tables according to functions of the flow entries. For example, the first flow entry is configured in one flow table, and the forwarding flow entry is configured in another flow table. This is not limited in this embodiment of the present application.

Various flow tables may be set in a TCAM or an RLDRAM of the switch.

It is easy to learn that in step 202, matching may be performed on the received data packet and each flow entry.

Further, in specific implementation, a flow table in a switch may be set according to a port of the switch. For example, one port of a switch may be corresponding to a group of flow tables. Each group of flow tables may include one flow table (the flow table includes all types of flow entries), or each group of flow tables may include multiple flow tables (the multiple flow tables include different types of flow entries). A data packet received at a port is matched only against a flow table corresponding to the port. In another example, only one group of flow tables may be configured in a switch, and data packets received at all ports are matched against the group of flow tables.

Step 203: The switch performs an operation on a storage device according to an operation command in an action field of the successfully matched first flow entry.

Specifically, step 203 may include:

when the operation command in the action field of the successfully matched first flow entry is a read operation command, reading data from the storage device and returning the read data to a node corresponding to the source node information; or when the operation command in the action field of the successfully matched first flow entry is a write operation command, writing data that is in the data packet into the storage device.

A specific application scenario of this embodiment and a specific operation procedure of the switch are described in detail with reference to FIG. 4 in the following.

A processor 04 and processor 42 run an application program together. The processor 04 interacts with the processor 42 to determine that data required by the processor 42 to run the application program needs to be obtained from the processor 04. The application program applies to a controller for shared storage space (the storage space is storage space of a storage device embedded in a switch), so that the processor 04 may write the data required by the processor 42 into the shared storage space for access of the processor 42. When a system is set up, the controller learns all storage devices in switches and manages all the storage devices in the switches.

The controller allocates storage space in a switch 11 to the application program, notifies the processor 04 and the processor 42 of an address of the allocated storage space (for example, storage space allocation information may be sent, and the storage space allocation information may include a switch identifier and a storage space address), and sends flow table configuration information to the switch 11. The flow table configuration information is used to configure a first flow entry. There are at least two configured first flow entries. A matching field of one first flow entry includes a source node identifier (04), a destination node identifier (11), and a protocol type (WR), and a corresponding action field is a write operation command (MEM WR). A matching field of the other first flow entry includes a source node identifier (xx), a destination node identifier (11), and a protocol type (RD), and a corresponding action field is a read operation command (MEM RD).

In addition, the controller may further send flow table configuration information to another switch (for example, a switch 00 or 01). The flow table configuration information is used to configure a forwarding flow entry. The forwarding flow entry is used to instruct to forward, to the switch 11, a data packet that is sent by the processor 04 and the processor 42 to the switch 11.

Figure 4:
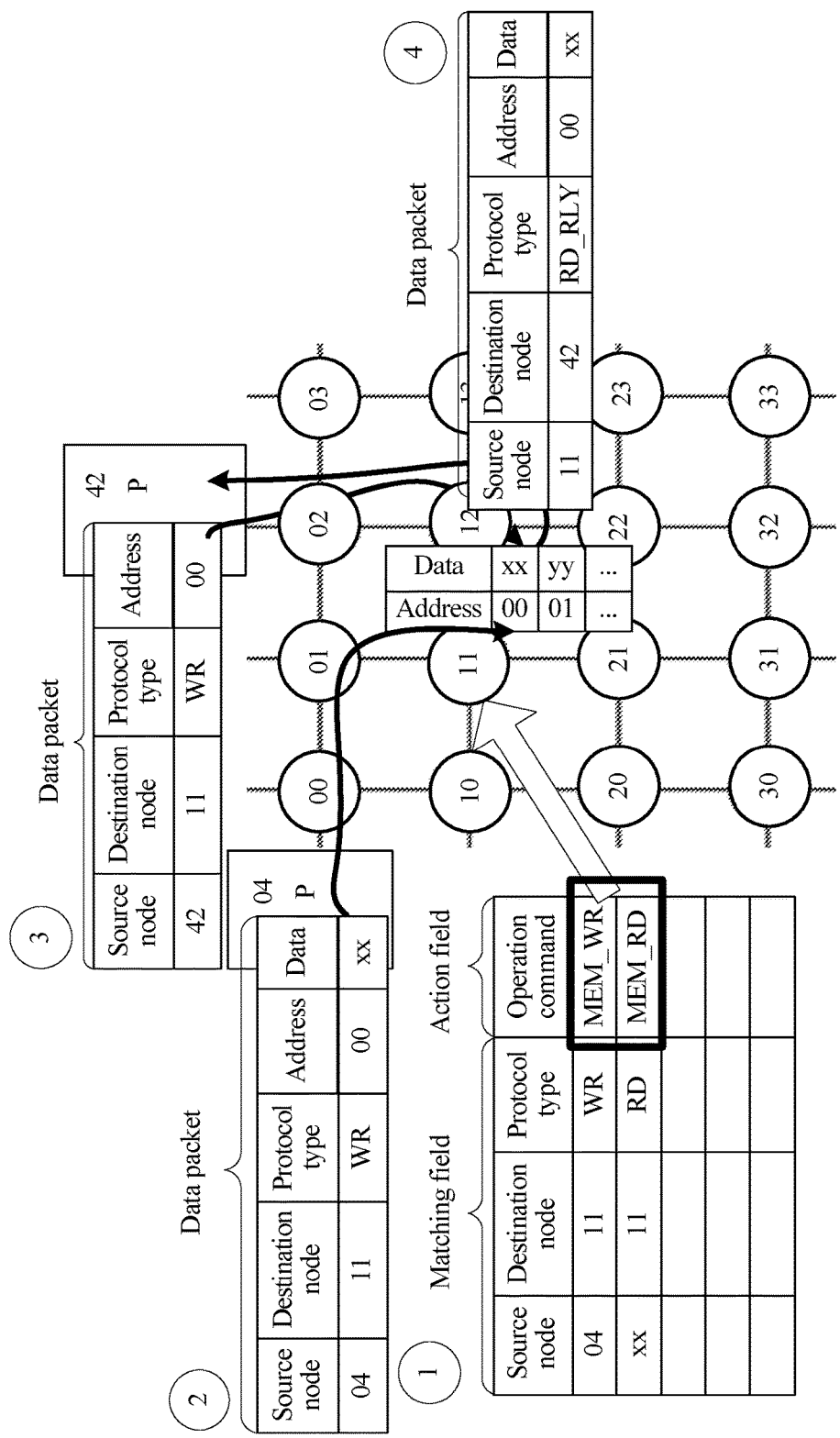
FIG. 4 is a schematic diagram of an access example of a memory access method according to Embodiment 2 of the present application.

After the processor 04 obtains the storage space allocated by the controller, as shown in FIG. 4, the processor 04 sends a write request data packet (2) to the switch 00 in an interconnection network. The write request data packet includes a source node identifier (04), a destination node identifier (11), a protocol type (WR, indicating a write request), a write address (00), and to-be-written data (xx). The to-be-written data (xx) is the data required by the processor 42 to run the application program. The switch 00 forwards the write request data packet to the switch 01, and the switch 01 forwards the write request data packet to the switch 11 (that is, the destination node). It is easy to learn that, after receiving the write request data packet, the switch 00 and the switch 01 perform flow table matching on the write request data packet, and according to an action field of the successfully matched forwarding flow entry, forward the write request data packet.

As described above, a flow table (1) in the switch 11 includes two first flow entries. A matching field of a flow entry 1 includes a source node identifier (04), a destination node identifier (11), and a protocol type (WR), and a corresponding action field is a write operation command (MEM WR). A matching field of a flow entry 2 includes a source node identifier (xx), a destination node identifier (11), and a protocol type (RD), and a corresponding action field is a read operation command (MEM RD). After the switch 11 performs flow table matching on the write request data packet, the write request data packet may be successfully matched with the flow entry 1. Therefore, the write operation command is executed on a storage device in the switch 11, and the to-be-written data xx is written into the address 00 of the storage device in the switch 11.

Similarly, the processor 42 sends a read request data packet (3) to a switch 02 in the interconnection network. The read request data packet includes a source node identifier (42), a destination node identifier (11), a protocol type (RD, indicating a read request), and a read address (00). The switch 02 forwards the read request data packet to a switch 12, and the switch 12 forwards the read request data packet to the switch 11 (that is, the definition node). It is easy to learn that, after receiving the read request data packet, the switch 02 and the switch 12 perform flow table matching on the read request data packet, and according to the action field of the successfully matched forwarding flow entry, forward the read request data packet.

After the switch 11 performs flow table matching on the read request data packet, the read request data packet may be successfully matched with the flow entry 2. Therefore, the read operation command is executed by the storage device in the switch 11, and the data xx is read from the address 00 of the storage device in the switch 11. A reply data packet (4) is further generated. The reply data packet includes a source node identifier (11), a destination node identifier (42), a protocol type (RD RLY, indicating a read reply), a read address (00), and read data (xx). The reply data packet is returned to the processor 42 by using the switch 12 and switch 02.

It can be learned from the processing procedure of the read request data packet that, in comparison with an existing read request procedure for accessing an external storage device (a read request data packet is first sent by a processor to an accessed interconnection network and then forwarded to the external storage device by using the interconnection network, and a read reply data packet is sent by the external storage device to the interconnection network and then forwarded to the processor by using the interconnection network, so that in an access process, for a data packet, the interconnection network needs to be accessed and detached twice), in an access process in this embodiment, for a data packet, an interconnection network needs to be accessed and detached only once, so that the memory access method in this embodiment of the present application may save network resources.

It should be noted that, the foregoing application scenario is merely an example and is not limiting. This embodiment of the present application is further applied to the following scenario: A controller first allocates shared storage space to an application, and allocates the corresponding application to a processor for processing. In this case, the application allocated to the processor learns in advance that the shared storage space can be used, and therefore, can directly access the shared storage space.

Step 204: The switch performs computation processing on data in the data packet according to an operation command in an action field of a successfully matched second flow entry, to obtain a computation result.

In implementation, a computation module may be set in the switch, or a specific computation device may be disposed in the switch. The switch sends the data to the specific computation device and receives the computation result returned by the computation device.

Step 205: The switch sends the computation result to the processor.

The processor is a node corresponding to the source node information in the data packet.

In this embodiment, the computation result is sent to the processor in step 201.

It is easy to learn that the flow entry in the switch may be configured by an OFC. Therefore, the method may further include:

receiving a flow table configuration message sent by the OFC, where the flow table configuration message is used to configure the flow entry for the switch; and configuring the flow entry according to the flow table configuration message.

In this embodiment of the present application, a storage device is embedded in a switch, and flow table matching is performed on a received data packet; and when the data packet successfully matches a first flow entry in a flow table, an operation is directly performed, according to an operation command in an action field of the first flow entry, on the storage device embedded in the switch, so as to reduce and even eliminate a possibility that a processor accesses a remote memory, and reduce a memory access delay. In addition, because storage devices in switches store data separately, there is no copy in a storage device in another switch and no problem for maintaining cache coherence. This simplifies the implementation. Moreover, when the first flow entry is successfully matched, because each switch directly accesses a storage device inside the switch, for one access request, an interconnection network needs to be accessed and detached only once (that is, receiving the access request and returning a reply message), so as to save network resources. Further, in this embodiment, a second flow entry is further configured in the switch. When the data packet is matched with the second flow entry, computation processing may be performed on the data in the data packet, so as to enhance a network hardware computation capacity.

Embodiment 3

This embodiment of the present application provides a switch. A flow table is set in the switch. The flow table includes at least one flow entry, and each flow entry includes a matching field and an action field. The matching field is used to match information in a data packet received by the switch, and the action field is used to indicate an operation to be performed on the data packet when the flow entry is successfully matched. The flow entry in the flow table usually includes a forwarding flow entry. The forwarding flow entry is used to determine a forwarding egress of a data packet. The flow entry in the flow table may further include a data packet modification flow entry. The data packet modification flow entry is used to determine to modify information in a data packet, for example, to modify a header field in the data packet. In addition, a storage device is further embedded in the switch, such as an SRAM or a DRAM. In implementation, the switch may be an OFS.

Figure 5:
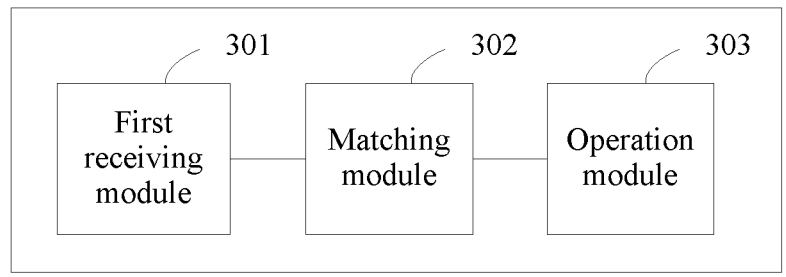
FIG. 5 is a structural block diagram of a switch according to Embodiment 3 of the present application.

Referring to FIG. 5, the switch includes a first receiving module 301, a matching module 302, and an operation module 303.

The first receiving module 301 is configured to receive a data packet, where the data packet includes source node information, destination node information, and a protocol type, where the protocol type is used to indicate a type of the data packet. The source node information may be a source node identifier, a source node MAC address, or the like. The destination node information may be a destination node identifier, a destination node MAC address, or the like. The protocol type is used to indicate a type of the data packet, such as a read request data packet, a write request data packet, or a computation request data packet.

The matching module 302 is configured to perform flow table matching on the data packet received by the first receiving module 301, where the flow table includes at least one flow entry, where the flow entry includes a matching field and an action field, and the at least one flow entry includes a first flow entry, where a matching field of the first flow entry is used to match the source node information, the destination node information, and the protocol type in the data packet, and an action field of the first flow entry is used to indicate an operation command for the storage device embedded in the switch. The operation command includes but is not limited to a read operation command and a write operation command.

It is easy to learn that, the operation command in the action field of the first flow entry is generally mutually corresponding to the protocol type in the matching field of the first flow entry. For example, if the protocol type in the matching field of the first flow entry is used to indicate a read request data packet, the operation command in the action field of the first flow entry is a read operation command for the storage device embedded in the switch.

In implementation, various flow entries (such as the first flow entry, the forwarding flow entry, and the data packet modification flow entry) may be configured in one flow table, or different flow entries may be configured in different flow tables according to functions of the flow entries.

Various flow tables are usually set in a ternary content-addressable memory (TCAM) or a reduced latency dynamic random access memory RLDRAM) of the switch.

The operation module 303 is configured to: when the data packet successfully matches the first flow entry, perform an operation on the storage device according to the operation command in the action field of the successfully matched first flow entry.

In this embodiment of the present application, a storage device is embedded in a switch, and flow table matching is performed on a received data packet; and when the data packet successfully matches a first flow entry in a flow table, an operation is directly performed, according to an operation command in an action field of the first flow entry, on the storage device embedded in the switch, so as to reduce and even eliminate a possibility that a processor accesses a remote memory, and reduce a memory access delay. In addition, because storage devices in switches store data separately, there is no copy in a storage device in another switch and no problem for maintaining cache coherence. This simplifies the implementation. Moreover, when the first flow entry is successfully matched, because each switch directly accesses a storage device inside the switch, for one access request, an interconnection network needs to be accessed and detached only once (that is, receiving the access request and returning a reply message), so as to save network resources.

Embodiment 4

This embodiment of the present application provides a switch. A flow table is set in the switch. The flow table includes at least one flow entry, and each flow entry includes a matching field and an action field. The matching field is used to match information in a data packet received by the switch, and the action field is used to indicate an operation to be performed on the data packet when the flow entry is successfully matched. The flow entry in the flow table usually includes a forwarding flow entry. The forwarding flow entry is used to determine a forwarding egress of a data packet. The flow entry in the flow table may further include a data packet modification flow entry. The data packet modification flow entry is used to determine to modify information in a data packet, for example, to modify a header field in the data packet. In addition, a storage device is further embedded in the switch, such as an SRAM or a DRAM. In implementation, the switch may be an OFS, or may be another switch having a matching function.

Figure 6:
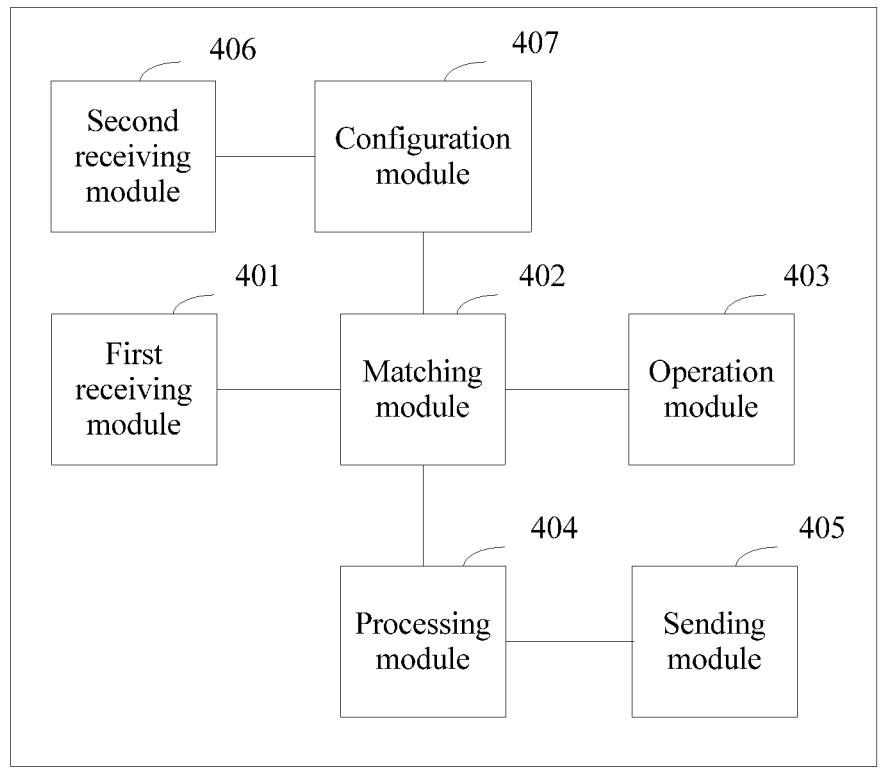
FIG. 6 is a structural block diagram of a switch according to Embodiment 4 of the present application.

Referring to FIG. 6, the switch includes a first receiving module 401, a matching module 402, and an operation module 403.

The first receiving module 401 is configured to receive a data packet, where the data packet includes source node information, destination node information, and a protocol type, where the protocol type is used to indicate a type of the data packet. A matching module 402 is configured to perform flow table matching on the data packet received by the first receiving module 401, where the flow table includes at least one flow entry, where the flow entry includes a matching field and an action field, and the at least one flow entry includes a first flow entry, where a matching field of the first flow entry is used to match the source node information, the destination node information, and the protocol type in the data packet, and an action field of the first flow entry is used to indicate an operation command for a storage device embedded in the switch. The operation module 403 is configured to: when the data packet successfully matches the first flow entry, perform an operation on the storage device according to the operation command in the action field of the successfully matched first flow entry.

The source node information may be a source node identifier, a source node MAC address, or the like. The destination node information may be a destination node identifier, a destination node MAC address, or the like. The protocol type is used to indicate a type of the data packet, such as a read request data packet, a write request data packet, or a computation request data packet.

The data packet may further include an operation address, such as a read/write address. It may be understood that when the data packet is a write data packet, the data packet further includes to-be-written data.

In an implementation manner of this embodiment, the operation module 402 may include:

a read unit, configured to read data from the storage device when the operation command in the first flow entry is a read operation command;

a sending unit, configured to return the data read by the read unit to a node corresponding to the source node information; and a write unit, configured to write data that is in the data packet into the storage device when the operation command in the first flow entry is a write operation command.

The operation command in the first flow entry includes but is not limited to a read operation command and a write operation command. It is easy to learn that, the operation command in the action field of the first flow entry is generally mutually corresponding to the protocol type in the matching field of the first flow entry. For example, if the protocol type in the matching field of the first flow entry is used to indicate a read request data packet, the operation command in the action field of the first flow entry is a read operation command for the storage device embedded in the switch.

In this embodiment, the flow entry in the switch further includes a second flow entry, a matching field of the second flow entry is used to match the source node information, the destination node information, and the protocol type in the data packet, and an action field of the second flow entry is used to indicate an operation command for performing computation processing on the data in the data packet. The computation processing includes but is not limited to a CRC or FFT.

In implementation, various flow entries (such as the first flow entry, the forwarding flow entry, and the data packet modification flow entry) may be configured in one flow table, or different flow entries may be configured in different flow tables according to functions of the flow entries. For example, the first flow entry is configured in one flow table, and the forwarding flow entry is configured in another flow table. This is not limited in this embodiment of the present application.

Various flow tables may be set in a TCAM or an RLDRAM of the switch.

It is easy to learn that the matching module 402 may perform matching between the data packet received by the switch and each flow entry in the switch.

Further, in specific implementation, a flow table in a switch may be set according to a port of the switch. For example, one port of a switch may be corresponding to a group of flow tables. Each group of flow tables may include one flow table (the flow table includes all types of flow entries), or each group of flow tables may include multiple flow tables (the multiple flow tables include different types of flow entries). A data packet received at a port is matched only against a flow table corresponding to the port. In another example, only one group of flow tables may be configured in a switch, and data packets received at all ports are matched against the group of flow tables.

Correspondingly, the switch may further include:

a processing module 404, configured to: when the data packet successfully matches the second flow entry, perform computation processing on the data in the data packet according to the operation command in the action field of the successfully matched second flow entry, to obtain a computation result; and a sending module 405, configured to send the computation result obtained by the processing module 404 to the node corresponding to the source node information in the data packet, such as a processor.

In implementation, a computation module may be set in the switch, or a specific computation device may be disposed in the switch. The switch sends the data to the specific computation device and receives the computation result returned by the computation device.

Optionally, the switch may further include:

a second receiving module 406, configured to receive a flow table configuration message sent by a controller, where the flow table configuration message is used to configure the flow entry for the switch; and a configuration module 407, configured to configure the flow entry according to the flow table configuration message received by the second receiving module 406.

In this embodiment of the present application, a storage device is embedded in a switch, and flow table matching is performed on a received data packet; and when the data packet successfully matches a first flow entry in a flow table, an operation is directly performed, according to an operation command in an action field of the first flow entry, on the storage device embedded in the switch, so as to reduce and even eliminate a possibility that a processor accesses a remote memory, and reduce a memory access delay. In addition, because storage devices in switches store data separately, there is no copy in a storage device in another switch and no problem for maintaining cache coherence. This simplifies the implementation. Moreover, when the first flow entry is successfully matched, because each switch directly accesses a storage device inside the switch, for one access request, an interconnection network needs to be accessed and detached only once (that is, receiving the access request and returning a reply message), so as to save network resources. Further, in this embodiment, a second flow entry is further configured in the switch. When the data packet is matched with the second flow entry, computation processing may be performed on the data in the data packet, so as to enhance a network hardware computation capacity.

Embodiment 5

Figure 7:
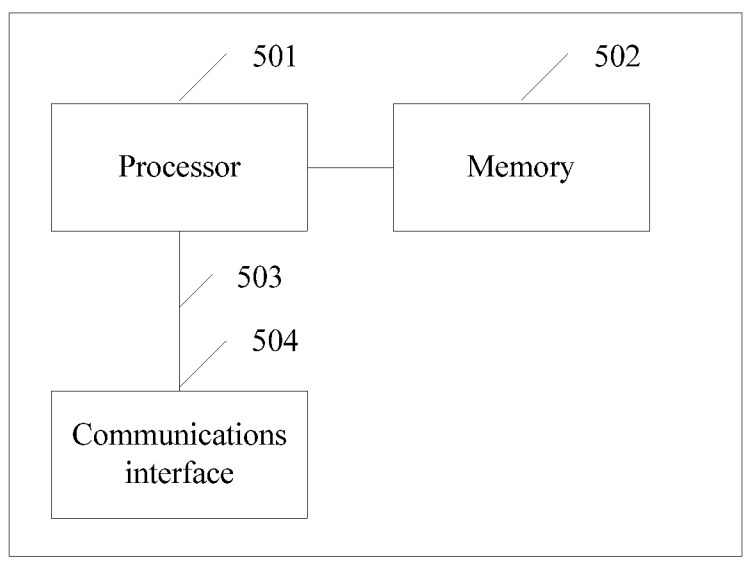
FIG. 7 is a structural block diagram of a switch according to Embodiment 5 of the present application.

This embodiment of the present application provides a switch. Referring to FIG. 7, the switch includes a processor 501, a memory 502, a bus 503, and a communications interface 504. The memory 502 is used to store a computer execution command. The processor 501 and the memory 502 are connected by using the bus 503. When the computer runs, the processor 501 executes the computer execution command stored in the memory 502, so that the switch executes the method that is executed by the switch in Embodiment 1 or Embodiment 2.

The switch further includes an embedded storage device, and the embedded storage device may be an SRAM, a DRAM, or the like. The storage device may be the memory 502, or may be a storage device independent of the memory 502.

Figure 8:
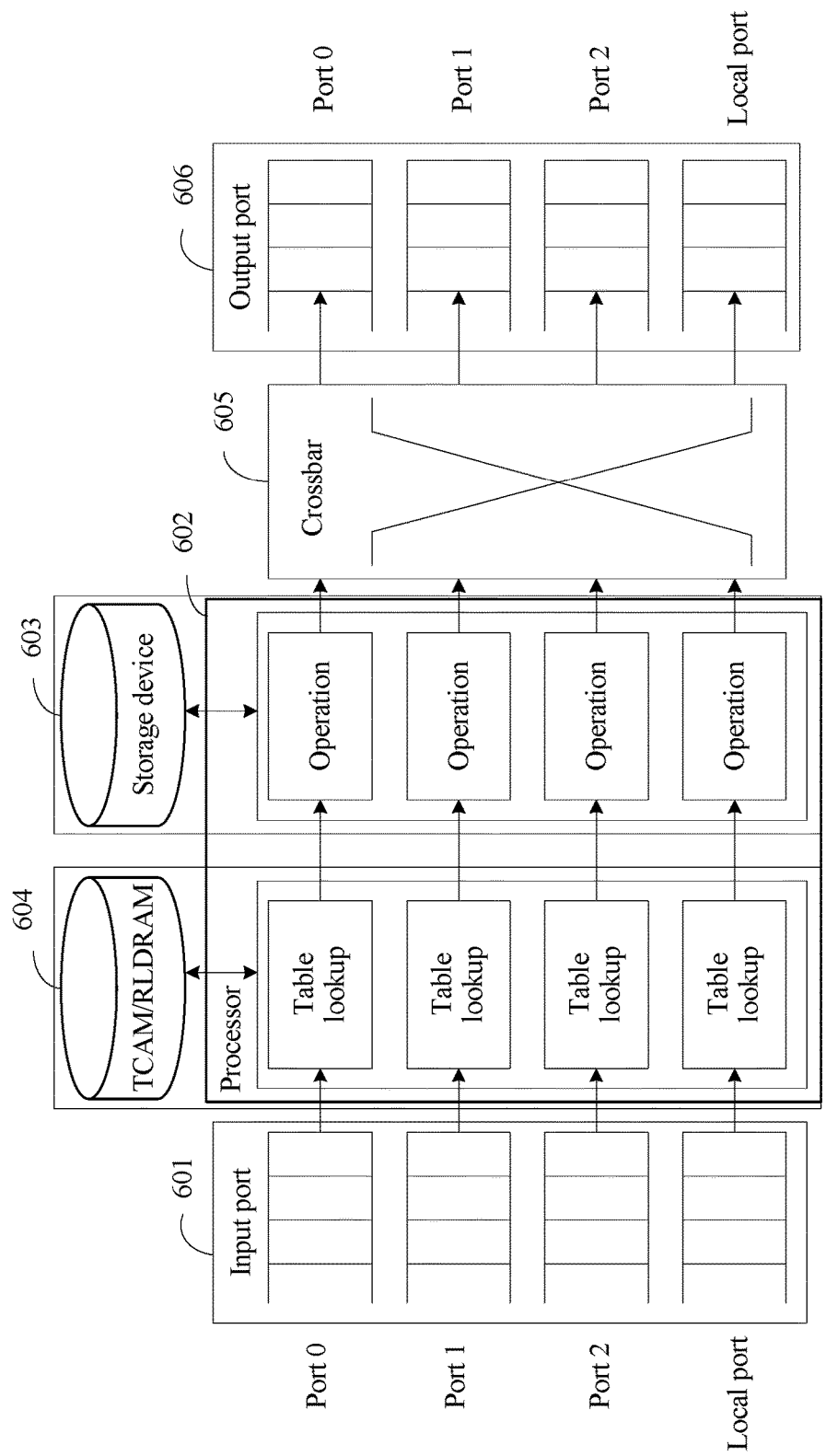
FIG. 8 is a structural diagram of specific implementation of a switch according to Embodiment 5 of the present application.

In specific implementation, a hardware structure of the switch may be shown in FIG. 8. The switch includes an input port 601, a processor 602, an embedded storage device 603, a memory 604, a crossbar bus 605, and an output port 606.

The input port 601 is configured to receive a data packet, where the data packet includes source node information, destination node information, and a protocol type.

The memory 604 is configured to store a flow table. The flow table includes at least one flow entry, and each flow entry includes a matching field and an action field. The flow entry in the flow table usually includes a forwarding flow entry. The forwarding flow entry is used to determine a forwarding egress of a data packet. The flow entry in the flow table may further include a data packet modification flow entry. The data packet modification flow entry is used to determine to modify information in a data packet, for example, to modify a header field in the data packet.

In this embodiment of the present application, the flow entry further includes a first flow entry, a matching field of the first flow entry is used to match the source node information, the destination node information, and the protocol type in the data packet, and an action field of the first flow entry is used to indicate an operation command for the storage device embedded in the switch. The operation command includes but is not limited to a read operation command and a write operation command.

It is easy to learn that, the operation command in the action field of the first flow entry is generally mutually corresponding to the protocol type in the matching field of the first flow entry. For example, if the protocol type in the matching field of the first flow entry is used to indicate a read request data packet, the operation command in the action field of the first flow entry is a read operation command for the storage device embedded in the switch.

In implementation, various flow entries (such as the first flow entry, the forwarding flow entry, and the data packet modification flow entry) may be configured in one flow table, or different flow entries may be configured in different flow tables according to functions of the flow entries.

The processor 602 is configured to perform flow table matching on the data packet at the input port by using the flow table in the memory 604; and when the data packet successfully matches the first flow entry in the flow table, perform an operation, such as a read operation or a write operation, on the embedded storage device 603 according to the operation command in the action field of the successfully matched first flow entry.

After the operation is completed, a reply data packet is output to the output port 606 by using the crossbar bus 605, and then fed back to a requesting device.

The processor 602 is further configured to: when the data packet successfully matches a second flow entry, perform computation processing on the data in the data packet according to an operation command in an action field of the successfully matched second flow entry, to obtain a computation result; and send the computation result to the requesting device by using the crossbar bus 605 and output port 606.

In this embodiment of the present application, a storage device is embedded in a switch, and flow table matching is performed on a received data packet; and when the data packet successfully matches a first flow entry in a flow table, an operation is directly performed, according to an operation command in an action field of the first flow entry, on the storage device embedded in the switch, so as to reduce and even eliminate a possibility that a processor accesses a remote memory, and reduce a memory access delay. In addition, because storage devices in switches store data separately, there is no copy in a storage device in another switch and no problem for maintaining cache coherence. This simplifies the implementation. Moreover, when the first flow entry is successfully matched, because each switch directly accesses a storage device inside the switch, for one access request, an interconnection network needs to be accessed and detached only once (that is, receiving the access request and returning a reply message), so as to save network resources. Further, in this embodiment, a second flow entry is further configured in the switch. When the data packet is matched with the second flow entry, computation processing may be performed on the data in the data packet, so as to enhance a network hardware computation capacity.

Embodiment 6

Figure 9:
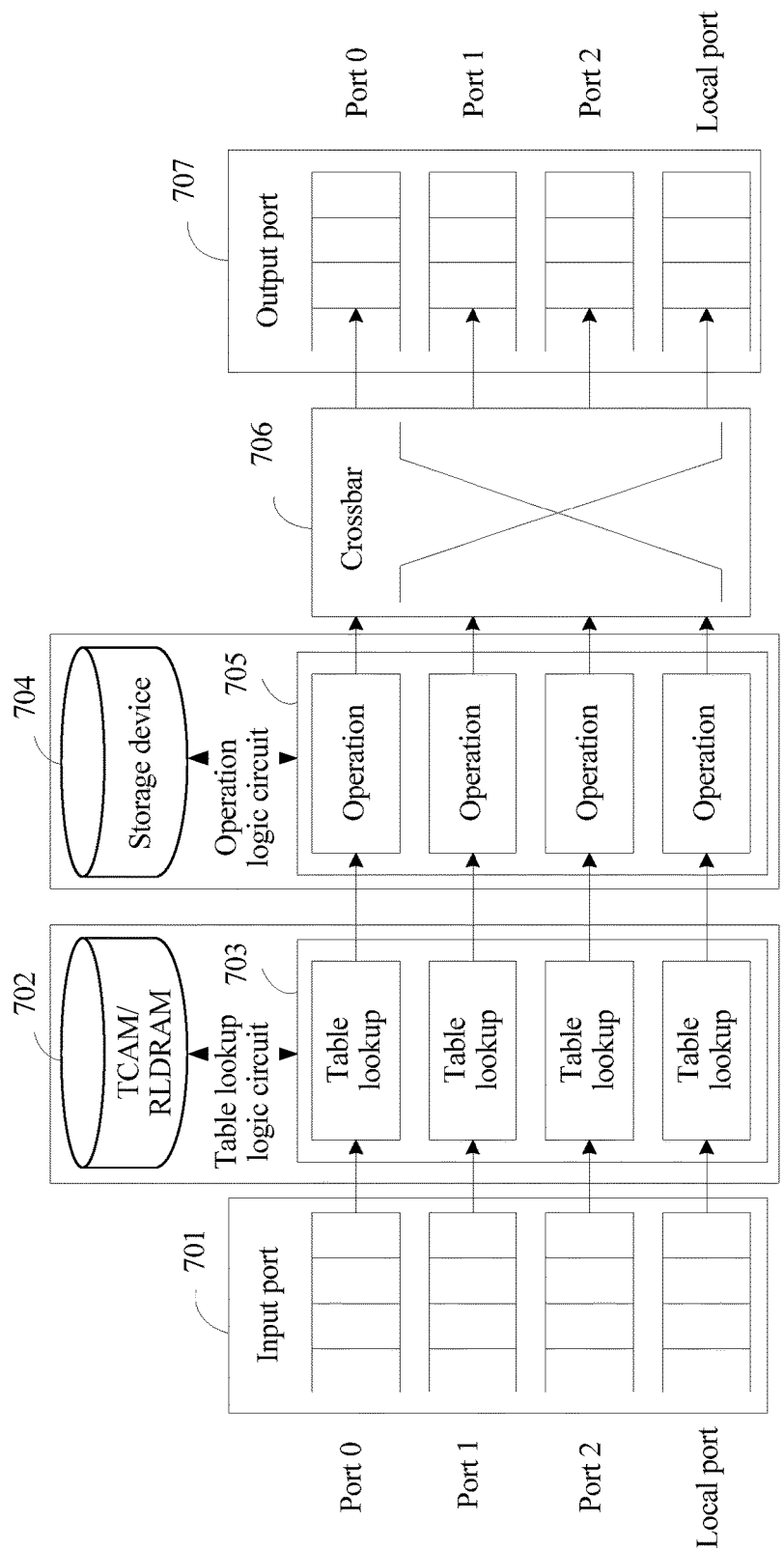
FIG. 9 is a structural diagram of hardware of a switch according to Embodiment 6 of the present application.

This embodiment of the present application provides a switch. Referring to FIG. 9, the switch includes an input port 701, a memory 702, a table lookup logic circuit 703, a storage device 704, an operation logic circuit 705, a crossbar bus 706, and an output port 707.

The input port 701 is configured to receive a data packet, where the data packet includes source node information, destination node information, and a protocol type.

The memory 702 is configured to store a flow table. The flow table includes at least one flow entry, and each flow entry includes a matching field and an action field. The flow entry in the flow table usually includes a forwarding flow entry. The forwarding flow entry is used to determine a forwarding egress of a data packet. The flow entry in the flow table may further include a data packet modification flow entry. The data packet modification flow entry is used to determine to modify information in a data packet, for example, to modify a header field in the data packet.

In this embodiment of the present application, the flow entry further includes a first flow entry, a matching field of the first flow entry is used to match the source node information, the destination node information, and the protocol type in the data packet, and an action field of the first flow entry is used to indicate an operation command for the storage device embedded in the switch. The operation command includes but is not limited to a read operation command and a write operation command.

It is easy to learn that, the operation command in the action field of the first flow entry is generally mutually corresponding to the protocol type in the matching field of the first flow entry. For example, if the protocol type in the matching field of the first flow entry is used to indicate a read request data packet, the operation command in the action field of the first flow entry is a read operation command for the storage device embedded in the switch.

In implementation, various flow entries (such as the first flow entry, the forwarding flow entry, and the data packet modification flow entry) may be configured in one flow table, or different flow entries may be configured in different flow tables according to functions of the flow entries.

The table lookup logic circuit 703 is configured to perform flow table matching on the data packet at the input port by using the flow table in the memory 702. The operation logic circuit 705 is configured to perform an operation, such as a read operation and a write operation, on the embedded storage device 704 according to the operation command in the action field of the successfully matched first flow entry and according to an output result of the table lookup logic circuit 703.

After the operation is completed, a reply data packet is output to the output port 707 by using the crossbar bus 706, and then fed back to a requesting device.

The operation logic circuit 705 is further configured to: when the data packet successfully matches a second flow entry, perform computation processing on the data in the data packet according to an operation command in an action field of the successfully matched second flow entry, to obtain a computation result; and send the computation result to the requesting device by using the crossbar bus 706 and output port 707.

The memory 702 may be a TCAM or an RLDRAM. The storage device 704 may be an SRAM, a DRAM, or the like. A specific circuit of the table lookup logic circuit 703 and a specific circuit of the operation logic circuit 705 are conventional circuits in the art. Therefore, detailed structural description is omitted herein.

In this embodiment of the present application, a storage device is embedded in a switch, and flow table matching is performed on a received data packet; and when the data packet successfully matches a first flow entry in a flow table, an operation is directly performed, according to an operation command in an action field of the first flow entry, on the storage device embedded in the switch, so as to reduce and even eliminate a possibility that a processor accesses a remote memory, and reduce a memory access delay. In addition, because storage devices in switches store data separately, there is no copy in a storage device in another switch and no problem for maintaining cache coherence. This simplifies the implementation. Moreover, when the first flow entry is successfully matched, because each switch directly accesses a storage device inside the switch, for one access request, an interconnection network needs to be accessed and detached only once (that is, receiving the access request and returning a reply message), so as to save network resources. Further, in this embodiment, a second flow entry is further configured in the switch. When the data packet is matched with the second flow entry, computation processing may be performed on the data in the data packet, so as to enhance a network hardware computation capacity.

Embodiment 7

Figure 10:
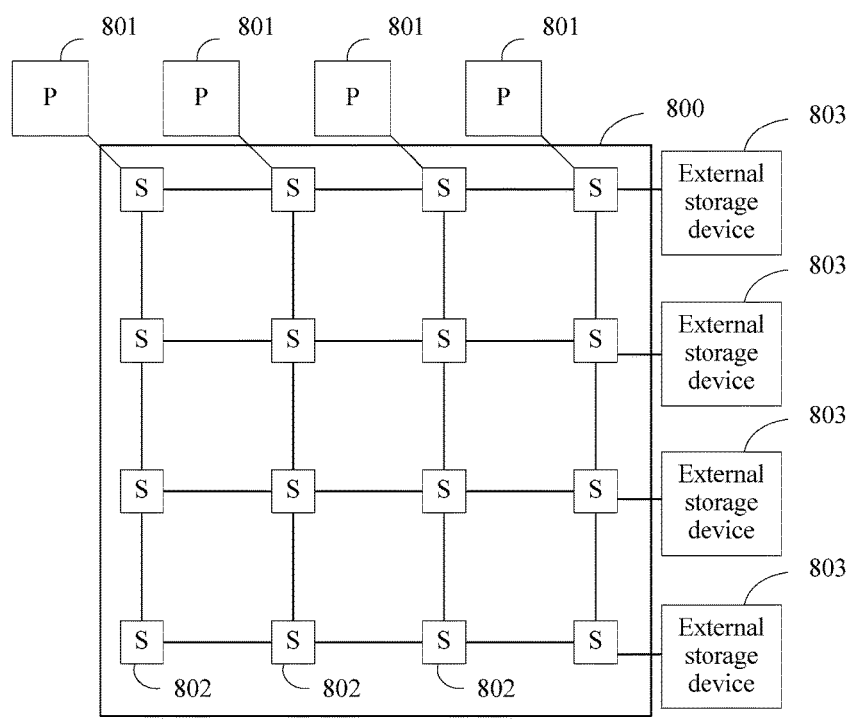
FIG. 10 is a structural block diagram of a multiprocessor system according to Embodiment 7 of the present application.

This embodiment of the present application provides a multiprocessor system. Referring to FIG. 10, the system includes multiple processors 801 and an interconnection network 800. The multiple processors 801 are communicatively connected to each other by using the interconnection network 800, and the interconnection network 800 includes multiple switches 802. The switch 802 is the switch provided in Embodiment 4, 5, or 6.

In an implementation manner of this embodiment, the multiprocessor system may further include multiple external storage devices 803. The multiple external storage devices 803 are communicatively connected to the multiple processors 801 by using the interconnection network 800.

In another implementation manner of this embodiment, the multiprocessor system may be a system on chip (SOC). It is easy to learn that the switch 802 may be an independent communications device.

In this embodiment of the present application, a storage device is embedded in a switch, and flow table matching is performed on a received data packet; and when the data packet successfully matches a first flow entry in a flow table, an operation is directly performed, according to an operation command in an action field of the first flow entry, on the storage device embedded in the switch, so as to reduce and even eliminate a possibility that a processor accesses a remote memory, and reduce a memory access delay. In addition, because storage devices in switches store data separately, there is no copy in a storage device in another switch and no problem for maintaining cache coherence. This simplifies the implementation. Moreover, when the first flow entry is successfully matched, because each switch directly accesses a storage device inside the switch, for one access request, an interconnection network needs to be accessed and detached only once (that is, receiving the access request and returning a reply message), so as to save network resources. Further, in this embodiment, a second flow entry is further configured in the switch. When the data packet is matched with the second flow entry, computation processing may be performed on the data in the data packet, so as to enhance a network hardware computation capacity.

It should be noted that, when the switch provided in the foregoing embodiment accesses a memory according to a received data packet, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. In addition, the switch provided in the foregoing embodiment and a memory management method embodiment pertain to a same concept. For a specific implementation process of the switch, refer to the method embodiment. Details are not described herein again.

The sequence numbers of the foregoing embodiments of the present application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present application, but are not intended to limit the present application. Any modification, equivalent replacement, and improvement made without departing from the spirit and principle of the present application shall fall within the protection scope of the present application.

What is claimed is:

1. A memory access method, the method comprising:
receiving, by a switch, a data packet, wherein the data packet comprises source node information, destination node information, and a protocol type, wherein the protocol type is used to indicate a type of the data packet;
matching a flow table on the data packet, wherein the flow table comprises at least one flow entry, wherein each flow entry comprises a matching field and an action field, and the at least one flow entry comprises:
 a first flow entry, wherein a matching field of the first flow entry is used to match the source node information, the destination node information, and the protocol type in the data packet, and an action field of the first flow entry is used to indicate an operation command for a storage device embedded in the switch, and
 a second flow entry, wherein a matching field of the second flow entry is used to match the source node information, the destination node information, and the protocol type in the data packet, and an action field of the second flow entry is used to indicate an operation command for performing computation processing on the data in the data packet;
when the data packet successfully matches the first flow entry, performing an operation on the storage device according to the operation command in the action field of the successfully matched first flow entry; and
when the data packet successfully matches the second flow entry, performing computation processing on the data in the data packet according to the operation command in the action field of the successfully matched second flow entry, to obtain a computation result, and sending the computation result to a node corresponding to the source node information in the data packet.

2. The method according to claim 1, wherein performing an operation on the storage device comprises:
when the operation command in the action field of the successfully matched first flow entry is a read operation command, reading data from the storage device and returning the read data to the node corresponding to the source node information; or
when the operation command in the action field of the successfully matched first flow entry is a write operation command, writing data that is in the data packet into the storage device.

3. The method according to claim 1, further comprising:
receiving a flow table configuration message sent by a controller, wherein the flow table configuration message is used to configure the at least one flow entry for the switch; and
configuring the flow entry according to the flow table configuration message.

4. A switch, comprising:
a processor;
a memory;
a bus; and
a communications interface;
wherein the processor and the memory are connected by using the bus, wherein the memory comprises instructions that, when executed by the processor, cause the switch to:
receive a data packet, wherein the data packet comprises source node information, destination node information, and a protocol type, wherein the protocol type is used to indicate a type of the data packet;
match a flow table on the data packet, wherein the flow table comprises at least one flow entry, wherein each flow entry comprises a matching field and an action field, and the at least one flow entry comprises:
 a first flow entry, wherein a matching field of the first flow entry is used to match the source node information, the destination node information, and the protocol type in the data packet, and an action field of the first flow entry is used to indicate an operation command for a storage device embedded in the switch, and
 a second flow entry, wherein a matching field of the second flow entry is used to match the source node information, the destination node information, and the protocol type in the data packet, and an action field of the second flow entry is used to indicate an operation command for performing computation processing on the data in the data packet;
perform an operation on the storage device according to the operation command in the action field of the successfully matched first flow entry when the data packet successfully matches the first flow entry; and
perform computation processing on the data in the data packet according to the operation command in the action field of the successfully matched second flow entry, to obtain a computation result, and send the computation result to a node corresponding to the source node information in the data packet, when the data packet successfully matches the second flow entry.

5. The switch according to claim 4, wherein the memory further comprises instructions that, when executed by the processor, cause the switch to:
read data from the storage device and return the read data to the node corresponding to the source node information when the operation command in the action field of the successfully matched first flow entry is a read operation command; or
write data that is in the data packet into the storage device when the operation command in the action field of the successfully matched first flow entry is a write operation command.

6. The method according to claim 4, wherein the memory further comprises instructions that, when executed by the processor, cause the switch to:
receive a flow table configuration message sent by a controller, wherein the flow table configuration message is used to configure the at least one flow entry for the switch; and
configure the flow entry according to the flow table configuration message.

7. A switch, comprising:
an input port, configured to receive a data packet, wherein the data packet comprises source node information, destination node information, and a protocol type, wherein the protocol type is used to indicate a type of the data packet;

a memory, configured to store a flow table, wherein the flow table comprises at least one flow entry, wherein the flow entry comprises a matching field and an action field, and the at least one flow entry comprises:

a first flow entry, wherein a matching field of the first flow entry is used to match the source node information, the destination node information, and the protocol type in the data packet, and an action field of the first flow entry is used to indicate an operation command for a storage device embedded in the switch, and a second flow entry, wherein a matching field of the second flow entry is used to match the source node information, the destination node information, and the protocol type in the data packet, and an action field of the second flow entry is used to indicate an operation command for performing computation processing on the data in the data packet;

a storage device, configured to store data;

a table lookup logic circuit, configured to match, by using the flow table stored in the memory, a flow table on the data packet received at the input port;

an operation logic circuit, configured to:

when the data packet successfully matches the first flow entry, performing an operation on the storage device according to the operation command in the action field of the successfully matched first flow entry, and when the data packet successfully matches the second flow entry, perform computation processing on the data in the data packet according to the operation command in the action field of the successfully matched second flow entry, to obtain a computation result, and send the computation result to a node corresponding to the source node information in the data packet a crossbar bus, configured to select an output port for the data packet transmitted by using the operation logic circuit; and an output port, configured to send the data packet transmitted by using the crossbar bus.

* * * * *